United States Patent [19]
Hoke et al.

[11] Patent Number: 6,101,814
[45] Date of Patent: Aug. 15, 2000

[54] LOW EMISSIONS CAN COMBUSTOR WITH DILUTION HOLE ARRANGEMENT FOR A TURBINE ENGINE

[75] Inventors: James B. Hoke, Tolland; Daryl B. Mountz, West Hartford; Howard Olsen, Wethersfield; Robert M. Sonntag, Manchester, all of Conn.

[73] Assignee: United Technologies Corporation, Hartford, Conn.

[21] Appl. No.: 09/292,136

[22] Filed: Apr. 15, 1999

[51] Int. Cl.$^7$ ............................... F02C 3/00; F02K 9/64; F23R 3/06

[52] U.S. Cl. ............................ 60/752; 60/757; 60/39.37; 60/748; 60/742

[58] Field of Search ............................. 60/752, 753, 754, 60/755, 756, 757, 758, 39.37, 742, 748

[56] References Cited

U.S. PATENT DOCUMENTS

| | | | |
|---|---|---|---|
| 2,601,000 | 6/1952 | Nerad | 60/758 |
| 2,638,745 | 5/1953 | Nathan | 60/755 |
| 2,658,339 | 11/1953 | Bonsall | 60/752 |
| 2,748,567 | 6/1956 | Dougherty | 60/39.37 |
| 2,858,673 | 11/1958 | Wirt | 60/757 |
| 3,134,229 | 5/1964 | Johnson | 60/748 |
| 3,169,367 | 2/1965 | Hussey | 60/39.37 |
| 3,283,502 | 11/1966 | Lefebvre | 60/742 |
| 3,306,333 | 2/1967 | Mock | 60/758 |
| 3,496,722 | 2/1970 | Howes et al. | 60/752 |
| 3,608,310 | 9/1971 | Vaught | 60/752 |
| 3,735,589 | 5/1973 | Caruel et al. | 60/757 |
| 3,899,881 | 8/1975 | Arvin | 60/737 |
| 3,899,882 | 8/1975 | Parker | 60/752 |
| 3,918,255 | 11/1975 | Holden | 60/753 |
| 4,129,985 | 12/1978 | Kajita et al. | 60/39.37 |
| 4,216,652 | 8/1980 | Herman et al. | 60/748 |
| 4,292,810 | 10/1981 | Glenn | 60/757 |
| 4,698,963 | 10/1987 | Taylor . | |
| 4,733,538 | 3/1988 | Vdoviak et al. | 60/752 |
| 4,893,468 | 1/1990 | Hines . | |
| 5,289,686 | 3/1994 | Razdan et al. | 60/752 |
| 5,467,926 | 11/1995 | Idleman et al. | 60/742 |

OTHER PUBLICATIONS

JT8D Dilution Hole Comparison.

*Primary Examiner*—Ted Kim
*Attorney, Agent, or Firm*—Kenneth C. Baran

[57] ABSTRACT

A low emissions combustor can 18 for an aircraft gas turbine engine includes a louvered combustor liner 24 with three arrays of dilution holes 52, 54, 56. The first hole array comprises twelve equally sized, equiangularly distributed holes that penetrates the liner about midway along its axial length. The second hole array comprises twelve equally sized holes, smaller than the holes of the first array, that penetrate the liner a predetermined distance aft of the first hole array. The holes of the second array are equiangularly distributed and each second hole is circumferentially aligned with a first hole. A third hole array penetrates the liner a predefined distance aft of the first array. The third holes are nonuniformly sized and nonequiangularly distributed to regulate the spatial temperature profile of combustion gases exiting the combustor can. The quantity, size, distribution and location of the holes mitigates undesirable exhaust emissions without affecting the performance or durability of the engine. Accordingly, the combustor can may be used to replace an existing combustor can in an older generation gas turbine engine.

12 Claims, 6 Drawing Sheets

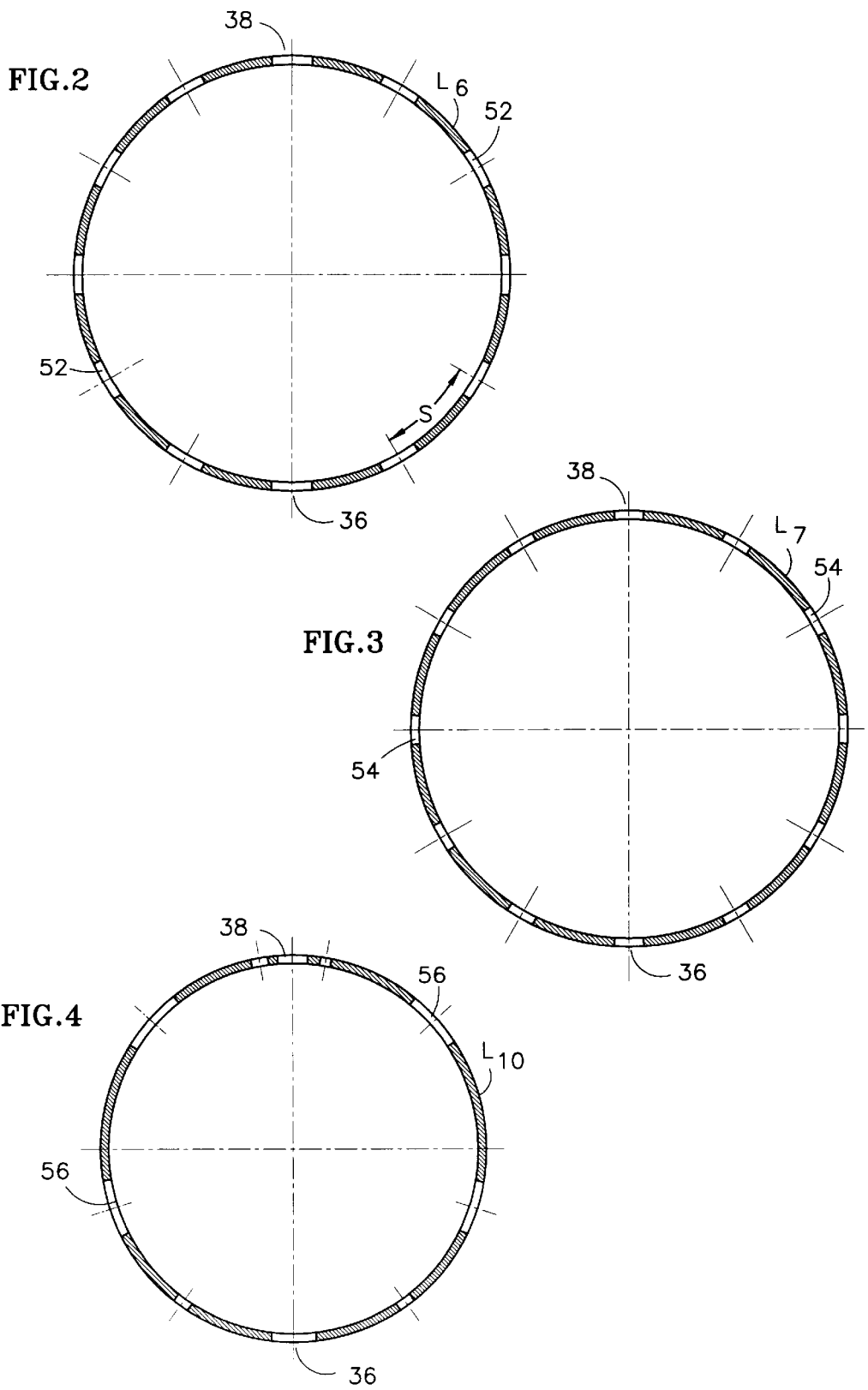

LOW EMISSIONS CAN COMBUSTOR WITH DILUTION HOLE ARRANGEMENT FOR A TURBINE ENGINE

CROSS REFERENCE TO RELATED APPLICATIONS

This application includes subject matter related to commonly owned copending U.S. Patent Application entitled "Coke Resistant Fuel Injector for a Low Emissions Combustor" filed concurrently herewith.

TECHNICAL FIELD

This invention relates to combustors for gas turbine engines and particularly to a combustor that reduces oxides of nitrogen (NOx), smoke and unburned hydrocarbon (UHC) emissions and that can be readily retrofit in a turbine engine in place of an existing, older generation combustor.

BACKGROUND OF THE INVENTION

Aircraft gas turbine engines are subject to increasingly strict environmental regulations, including limits on undesirable exhaust emissions. Newer generation engines are designed to comply with existing and anticipated regulations. However, older generation engines were designed in an era when environmental regulations were less stringent or nonexistent. These older generation engines fail to comply with anticipated regulations and may have to be retired despite being serviceable in all other respects. Retiring an otherwise serviceable engine represents a significant economic loss to the engine's owner.

An appealing alternative to retiring an older generation engine is to extend its useful life with upgraded components designed to make the engine compliant with regulatory requirements. For example, engine exhaust emissions may be reduced by retrofitting the engine with redesigned combustion chambers and fuel injectors. The redesigned combustion chambers and injectors must satisfy the conflicting requirements of reducing oxides of nitrogen (NOx), reducing smoke, reducing unburned hydrocarbons (UHC) and ensuring stability of the combustion flame. In addition, the presence of the redesigned components should not materially degrade engine performance or operability or compromise the durability of the engine's turbines.

One approach to clean combustion is referred to as rich burn, quick quench, lean burn (RQL). The annular combustors used in many modern gas turbine engines often use the RQL combustion concept. A combustion chamber configured for RQL combustion has liner that encloses three serially arranged combustion zones—a rich burn zone, a quench zone and a lean burn zone. The rich burn zone is at the forwardmost end of the combustion chamber and receives fuel and air from fuel injectors that project into the combustion chamber. The quench zone is immediately aft of the rich burn zone and features a set of dilution holes that penetrate the liner to introduce dilution air into the combustion chamber. The lean burn zone is aft of the quench zone.

During operation, the fuel injectors continuously introduce a quantity of air and a stoichiometrically excessive quantity of fuel into the rich burn zone. The resulting stoichiometrically rich fuel-air mixture is ignited and burned to partially release the energy content of the fuel. The fuel rich character of the mixture inhibits NOx formation in the rich burn zone and resists blowout of the combustion flame during any abrupt reduction in engine power. However if the mixture is overly rich, the combustion chamber will produce objectionable quantities of smoke. Moreover, an excessively rich mixture suppresses the temperature of the combustion flame, which can promote the production of unburned hydrocarbons (UHC). Even if the fuel-air mixture in the rich burn zone is, on average, neither overly rich nor insufficiently rich, spatial variations in the fuel-air ratio can result in local regions where the mixture is too rich to mitigate smoke and UHC emissions and/or insufficiently rich to mitigate NOx emissions. Thus, the ability of the fuel injector to deliver an intimately and uniformly blended mixture of fuel and air to the combustion chamber plays an important role in controlling exhaust emissions.

The fuel rich combustion products generated in the rich burn zone flow into the quench zone where the combustion process continues. Jets of dilution air are introduced transversely into the combustion chamber through the quench zone dilution holes. The dilution air supports further combustion to release additional energy from the fuel and also helps to consume smoke (by converting the smoke to carbon dioxide) that may have originated in the rich burn zone. The dilution air also progressively deriches the fuel rich combustion products as they flow through the quench zone and mix with the dilution air. Initially, the fuel-air ratio of the combustion products changes from fuel rich to approximately stoichiometric, causing an attendant rise in the combustion flame temperature. Since the quantity of NOx produced in a given time interval increases exponentially with flame temperature, substantial quantities of NOx can be produced during the initial quench process. As the quenching continues, the fuel-air ratio of the combustion products changes from approximately stoichiometric to fuel lean and the flame temperature diminishes. However until the mixture is diluted to a fuel-air ratio substantially lower than stoichiometric, the flame temperature remains high and considerable quantities of NOx continue to form. Accordingly, it is important for the quenching process to progress rapidly to limit the amount of time available for NOx formation, which occurs primarily while the mixture is at or near its stoichiometric fuel-air ratio.

The derished combustion products from the quench zone flow into the lean burn zone where the combustion process concludes. Additional jets of dilution air may be introduced transversely into the lean burn zone. The additional dilution air supports ongoing combustion to release energy from the fuel and helps to regulate the spatial temperature profile of the combustion products.

A low emissions combustion chamber intended as a replacement for an existing, high emissions combustion chamber in an older generation engine must also be physically and operationally compatible with the host engine. Obviously, the replacement combustion chamber must be sized to fit in the engine and should be able to utilize the engine's existing combustion chamber mounts. Furthermore, the replacement combustion chamber should not degrade the engine's performance, operability or durability. Accordingly, the quantity and pressure drop of dilution air introduced into the replacement combustion chamber should not exceed the quantity and pressure drop of dilution air introduced into the existing combustion chamber. Otherwise the operating line of the engine's compressor could rematch (shift), making the compressor susceptible to aerodynamic stall. In addition, introducing an increased quantity of dilution air into the combustion chamber would compromise the durabilty of the engine's turbines by diminishing the quantity of air available for turbine cooling. Finally, the spatial temperature profile of combustion gases entering the turbine should be unaffected by the presence of the replacement combustion chamber. Similarity of the temperature profile is important since the design of the engine's turbine cooling system, which cannot be easily modified, is predicated on the temperature profile produced by the existing combustion chamber. Any change in that profile would therefore compromise turbine durability.

The fuel injectors used in an RQL combustion chamber may be hybrid injectors. A hybrid injector includes a central, pressure atomizing primary fuel nozzle and a secondary airblast injector that circumscribes the primary nozzle. The pressure atomizing primary nozzle operates at all engine power settings including during engine startup. The airblast portion of the injector is disabled during engine startup and low power operation but is enabled for higher power operation. During operation, the primary nozzle introduces a swirling, conical spray of high pressure primary fuel into the combustion chamber and relies on an abrupt pressure gradient across a nozzle discharge orifice to atomize the primary fuel. The airblast portion of the injector introduces swirling, coannular streams of inner air, secondary fuel and outer air into the combustion chamber with the secondary fuel stream radially interposed between the air streams. Shearing action between the secondary fuel stream and the coannular air streams atomizes the fuel.

As already noted, the ability of the fuel injector to deliver an intimately and uniformly blended mixture of fuel and air to the combustion chamber is important for controlling exhaust emissions. However some spatial nonuniformity of the fuel-air ratio may be beneficial. For example, it may be desirable to have an enriched core of intermixed fuel and air near the injector centerline to guard against flame blowout during abrupt reductions in engine power. However, an overly enriched core may produce unacceptable smoke emissions during high power operation. This is especially true if the dilution air jets introduced in the combustion chamber dilution zone are unable to penetrate to the enriched core and consume the smoke.

One shortcoming of all types of turbine engine fuel injectors is their susceptibility to formation of coke, a hydrocarbon deposit that accumulates on the injector surfaces when the fuel flowing through the injector absorbs excessive heat. In a hybrid injector, coke that forms at the tip of the primary nozzle, near its discharge orifice, can corrupt the conical spray pattern of fuel issuing from the orifice so that the fuel is nonuniformly dispersed. The nonuniform fuel dispersal can result in appreciable spatial variation in the fuel air ratio, making it difficult to control NOx emissions without producing excessive smoke or UHC's in the combustion chamber rich burn zone. In extreme cases, the coke deposits may reduce the cone angle of the primary fuel spray, which can interfere with reliable ignition during engine startup.

Coke can also form on some surfaces of the airblast portion of the injector, particularly those surfaces most proximate to the combustion chamber. These deposits, like those that form at the tip of the primary nozzle, can interfere with uniform dispersal of the annular fuel and air streams. Moreover, these deposits can break away from the injector during engine operation and cause damage to other engine components.

From the foregoing it is evident that the strategy for minimizing NOx production and ensuring resistance to flame blowout (rich, low temperature burning) conflicts with the strategy for mitigating smoke and UHC's (leaner, higher temperature burning). It is also apparent that these conflicting demands are easier to reconcile if the fuel injectors provide a uniformly and intimately blended fuel-air mixture to the combustion chamber. However, an enriched core of fuel and air near the injector centerline is desirable to guard against flame blowout during abrupt engine power transients. It is also apparent that a rapid transition from a fuel rich stoichiometry to a fuel lean stoichiometry is highly desirable for inhibiting NOx formation. Finally, it is also clearly desirable that the performance or durability of the engine not be affected by the presence of replacement hardware.

SUMMARY OF THE INVENTION

It is, therefore, a principal object of the invention to provide a combustion chamber that simultaneously reduces the NOx, UHC and smoke emissions of an older generation gas turbine engine.

It is a further object of the invention to facilite emissions reductions with a fuel injector that resists coke formation and introduces a well mixed blend of fuel and air without compromising the reliability of engine ignition.

It is another object of the invention to provide a replacement combustion chamber for a turbine engine without adversely affecting the performance or durability of the engine.

According to the invention, a replacement combustor can for a gas turbine engine includes a plurality of dilution air holes judiciously positioned, sized and distributed to reduce NOx, smoke and UHC's while achieving the performance and durability of an older generation, higher emissions combustor can. In particular, the inventive combustor can has three arrays of dilution holes—a first array that penetrates the combustor liner about midway along the length of the liner, a second array a predetermined distance aft of the first array and circumferentially aligned therewith, and a third array a predefined distance aft of the third array. The holes of the third array are sized and circumferentially distributed to regulate the spatial temperature profile of combustion gases exiting the combustor can.

The principal advantage of the invention is its ability to simultaneously reduce emissions of NOx, UHC's and smoke without making the combustion flame susceptible to blowout.

Another advantage of the invention is its compatibility with an older generation engine so that the engine can be easily and inexpensively upgraded to meet strict emissions standards.

The foregoing features and advantages and the operation of the invention will become more apparent in light of the following description of the best mode for carrying out the invention and the accompanying drawings.

BRIEF DESCRIPTION OF THE DRAWINGS

FIGS. 2, 3 and 4 are views taken in the direction 2—2, 3—3 and 4—4 of FIG. 1A showing the circumferential distribution and size of dilution air holes that penetrate the combustor can.

BEST MODE FOR CARRYING OUT THE INVENTION

Figure 1:
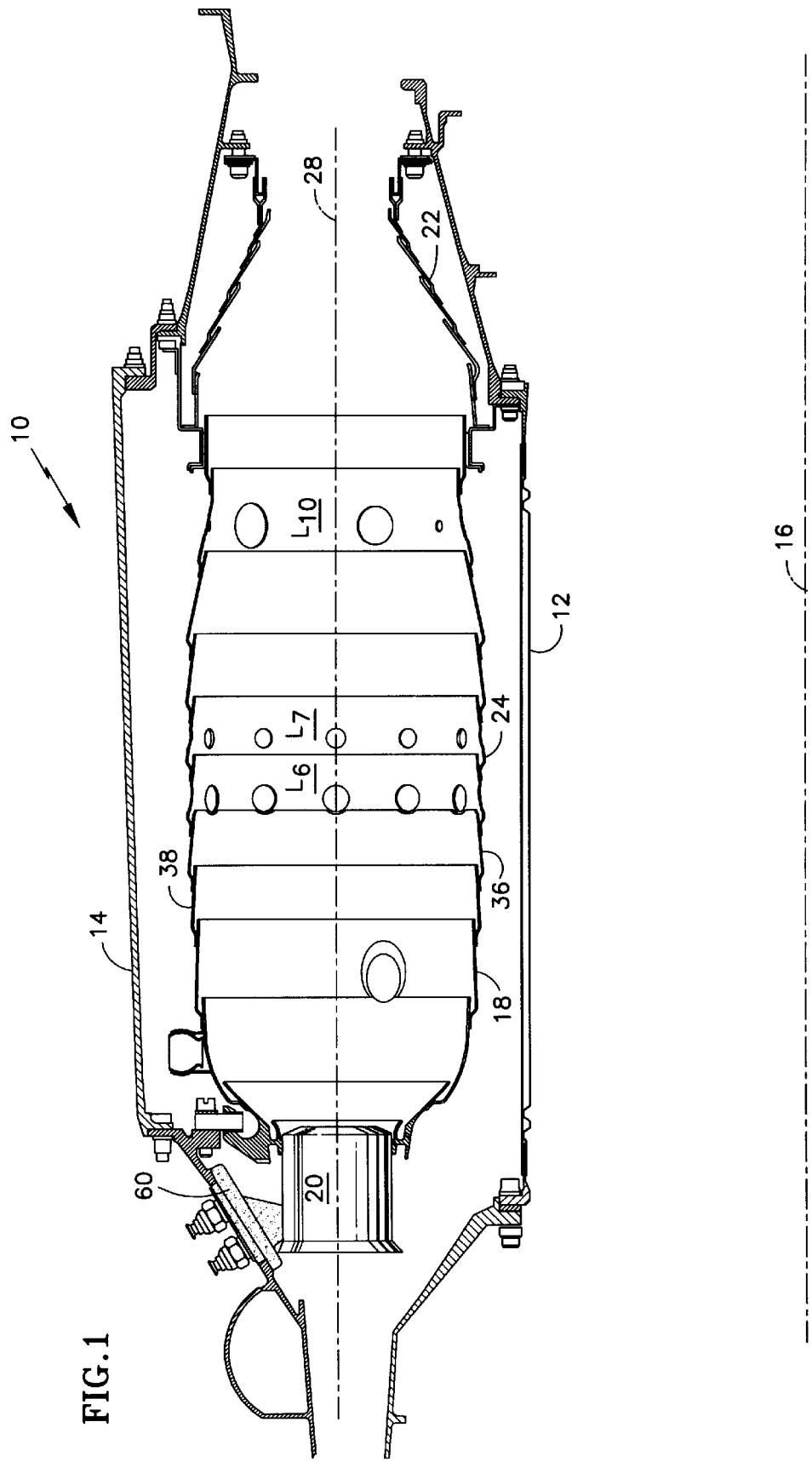
FIG. 1 is a cross sectional view of a combustor module of the present invention showing an annular pressure vessel, a representative louvered combustor can and a representative fuel injector.
Figure 1A:
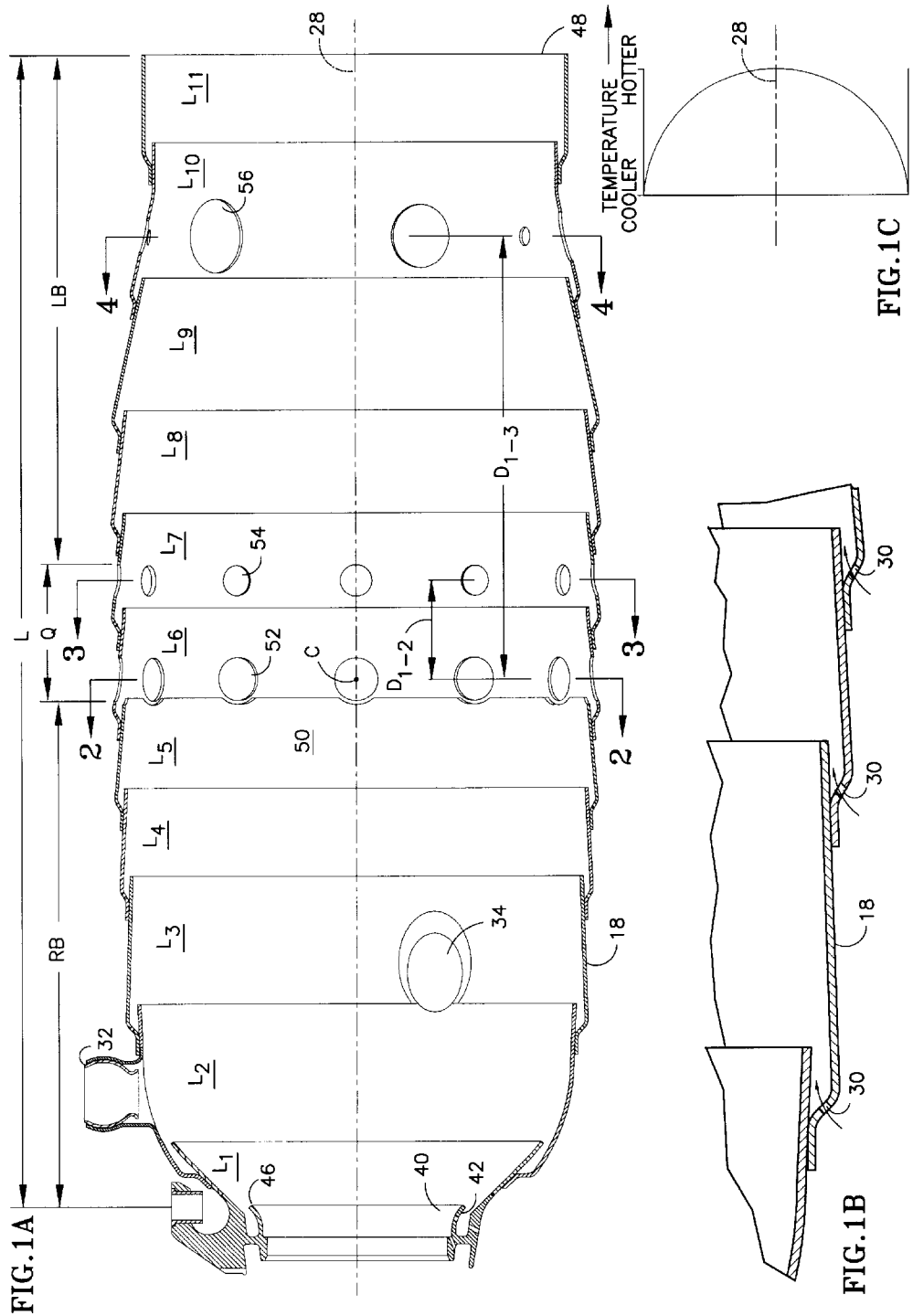
FIG. 1A is an enlarged view of the combustor can of FIG. 1.
Figure 1B:
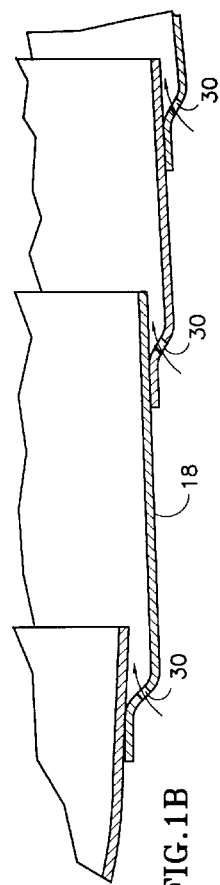
FIG. 1B is a more detailed view of the combustor can louvers visible in FIG. 1.

FIGS. 1, 1A and 1B illustrate a combustor module 10 for an aircraft gas turbine engine. The module includes an annular pressure vessel defined by inner and outer cases 12, 14 disposed about an axially extending module centerline 16. The module also includes nine combustion chamber assemblies equiangularly distributed around the pressure vessel. The use of multiple combustion chamber assemblies is typical of older generation gas turbine engines; newer generation engines usually employ an annular combustion chamber. Each combustion chamber assembly includes a combustor can 18 and a fuel injector 20 projecting into the combustor can. In the completed combustor module, the cans and their associated fuel injectors are secured to the outer case 14. An annular transition duct 22 extends from the combustor cans to channel hot combustion gases into a turbine module, not shown.

Each combustor can has a can liner 24 disposed about an axially extending liner centerline 28. The liner is comprised of eleven axially adjacent, overlapping louvers, $L_1$ through $L_{11}$, each having a circular cross section as seen in FIGS. 2, 3 and 4. Cooling air holes 30 (FIG. 1B) perforate the louvers to direct a film of cooling air along the inner surface of the can. Two of the nine cans include an ignitor boss 32 that accommodates an ignitor plug (not shown) and all nine cans include crossfire openings 34 to propagate flame circumferentially from can to can during engine startup.

Each can has a radially inner extremity 36 defined by the innermost intersection between the liner 24 and an imaginary plane that contains the can and module centerlines when the can is installed in the annular pressure vessel defined by cases 12, 14. A radially outer extremity 38 of the can is similarly defined by the outermost intersection between the liner and the imaginary plane. Each can also has a forward end with a fuel injector port 40 extending therethrough. The port is radially bordered by a fuel injector guide 42 whose trailing edge 46 defines a discharge opening. Each can also has an aft end that terminates at a liner trailing edge corresponding to trailing edge 48 of the eleventh louver. The liner has an effective axial length L of about 16.9 inches from the injector guide trailing edge to the trailing edge 48 of the eleventh louver. The liner circumscribes a combustion zone 50 within which a fuel-air mixture is ignited and burned.

Referring additionally to FIGS. 2, 3 and 4, first, second and third arrays of dilution air holes 52, 54, 56 penetrate the liner at selected fractions of the effective axial length L to admit jets of dilution air into the combustion zone 50. The quantity and sizes of the dilution holes are selected so that the pressure drop across the holes and the total quantity of dilution air introduced into each combustor can approximate the pressure drop and air consumption of an existing, older generation can. The dilution holes are judiciously positioned to control exhaust emissions and to regulate the spatial temperature profile of exhaust gases issuing from the aft end of each can. Throughout this specification the location of a dilution hole is the position of its center C and the axial location of a hole is expressed as a fraction or percentage of the effective axial length L. The dilution holes divide the combustion zone into a rich burn zone RB extending from injector guide trailing edge 46 to the forward edge of the first holes 52, a quench zone Q axially coextensive with the first and second hole arrays 52, 54 and a lean burn zone LB extending from the aft edge of the second holes 54 to the trailing edge of the can.

The first upstream-most array 52 of dilution holes penetrates the liner at a common axial location about midway along the effective axial length L of the liner. In the illustrated combustor, the holes penetrate the liner at a length fraction of about 0.458 or 45.8% which corresponds to the sixth louver $L_6$. The hole quantity and hole size are selected so that the dilution air jets penetrate substantially to the liner centerline 28. In the illustrated combustor can, louver $L_6$ is about 7.0 inches in diameter and the first hole array comprises twelve circular holes having a common first diameter of about 0.640 inches. The twelve holes are equiangularly distributed around the circumference of the liner with one hole positioned at the can outer extremity 38. About 43% of the dilution air admitted to the combustion zone enters through the first hole array.

The second array 54 of dilution holes penetrates the liner at a common axial location a predetermined distance $D_{1-2}$ aft of the first array. In the illustrated combustor, the second holes penetrate the liner at a length fraction of about 54%, or aft of the first hole array by about 8.2% of the effective axial length L. The axial position of the second holes places them in the seventh louver $L_7$, i.e. a louver adjacent to the louver penetrated by the first hole array. The quantity and size of the second holes, unlike the quantity and size of the first holes, need not be selected so that the dilution air jets penetrate substantially to the liner centerline 28. In the illustrated combustor can, louver $L_7$ is about 7.0 inches in diameter and the second hole array comprises twelve circular holes each having a common second diameter of about 0.425 inches. The twelve holes are equiangularly distributed around the circumference of the liner with one hole positioned at the can outer extremity 38 so that each second hole is circumferentially aligned with a hole of the first array. About 22% of the dilution air admitted to the combustion zone enters through the second hole array.

The third downstream-most array 56 of dilution holes penetrates the liner at a common axial location a predefined distance $D_{1-3}$ aft of the first array. The predefined distance $D_{1-3}$ exceeds the predetermined distance $D_{1-2}$ so that the third hole array is axially remote from the first and second hole arrays. In the illustrated combustor, the third holes penetrate the liner at a length fraction of about 84.3%. The axial position of the third holes places them in the tenth louver $L_{10}$, i.e. a louver axially nonadjacent to the louver penetrated by the second hole array.

The size and circumferential distribution of the third holes are selected so that the combustion gas stream issuing from the aft end of the can exhibits a radial temperature profile that approximates a prescribed profile. The prescribed profile may be one that mimics the profile attributable to an older generation, higher emissions combustor can. If so, the inventive combustor can may be used to replace the older generation combustor can without exposing the forward-most components of the turbine module to a temperature profile that those components were not designed to endure.

Figure 1C:
FIG. 1C is a schematic view showing a prescribed spatial temperature profile of combustion products exiting the combustor can of FIG. 1.

As shown schematically on FIG. 1C, such a profile is radially nonuniform, being relatively hotter near the liner centerline 28 and relatively cooler near the liner itself. In the illustrated combustor can, louver $L_{10}$ is about 6.1 inches in diameter and the third hole array comprises ten circular holes having nonuniform third diameters. The holes of the third array are nonequiangularly distributed around the circumference of the liner. In the illustrated combustor can, one hole is positioned at the can outer extremity 38 and the other nine holes are nonequiangularly displaced from the one hole by a specified angular offset. The hole diameters and angular offsets (in the clockwise direction as viewed by an observer looking from the aft end of the liner toward the forward end of the liner) are as specified below:

| Hole | Angular Offset | Diameter (inches) |
| --- | --- | --- |
| 1st | 0° | 0.400 |
| 2nd | 10° | 0.150 |
| 3rd | 48° | 0.865 |
| 4th | 108° | 0.790 |
| 5th | 144° | 0.250 |
| 6th | 180° | 0.680 |
| 7th | 216° | 0.250 |
| 8th | 252° | 0.830 |
| 9th | 312° | 0.965 |
| 10th | 350° | 0.230 |

About 35% of the dilution air admitted to the combustion zone enters through the third hole array.

Figure 5:
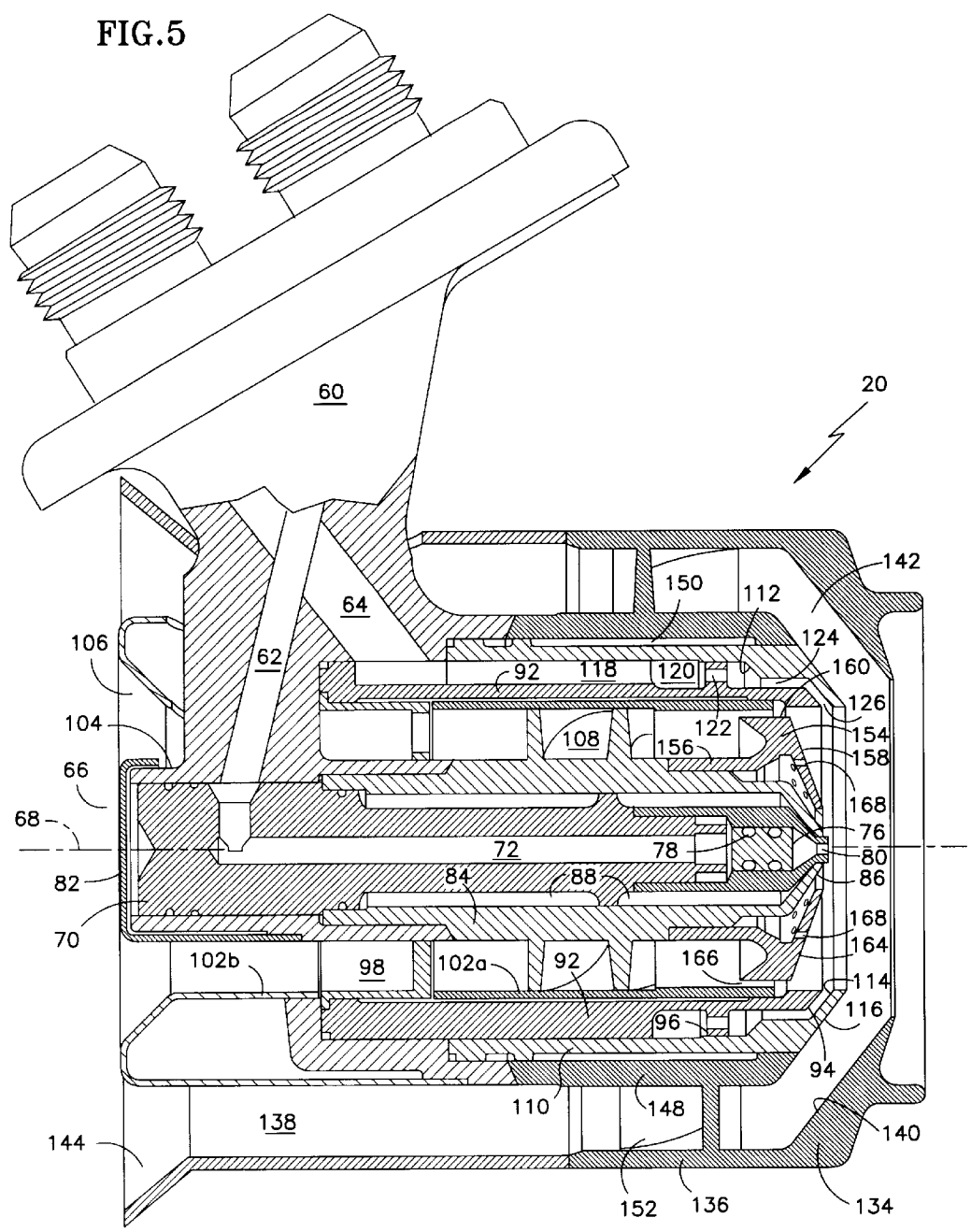
FIG. 5 is a cross sectional side view illustrating internal features of the fuel injector of FIG. 1.
Figure 5A:
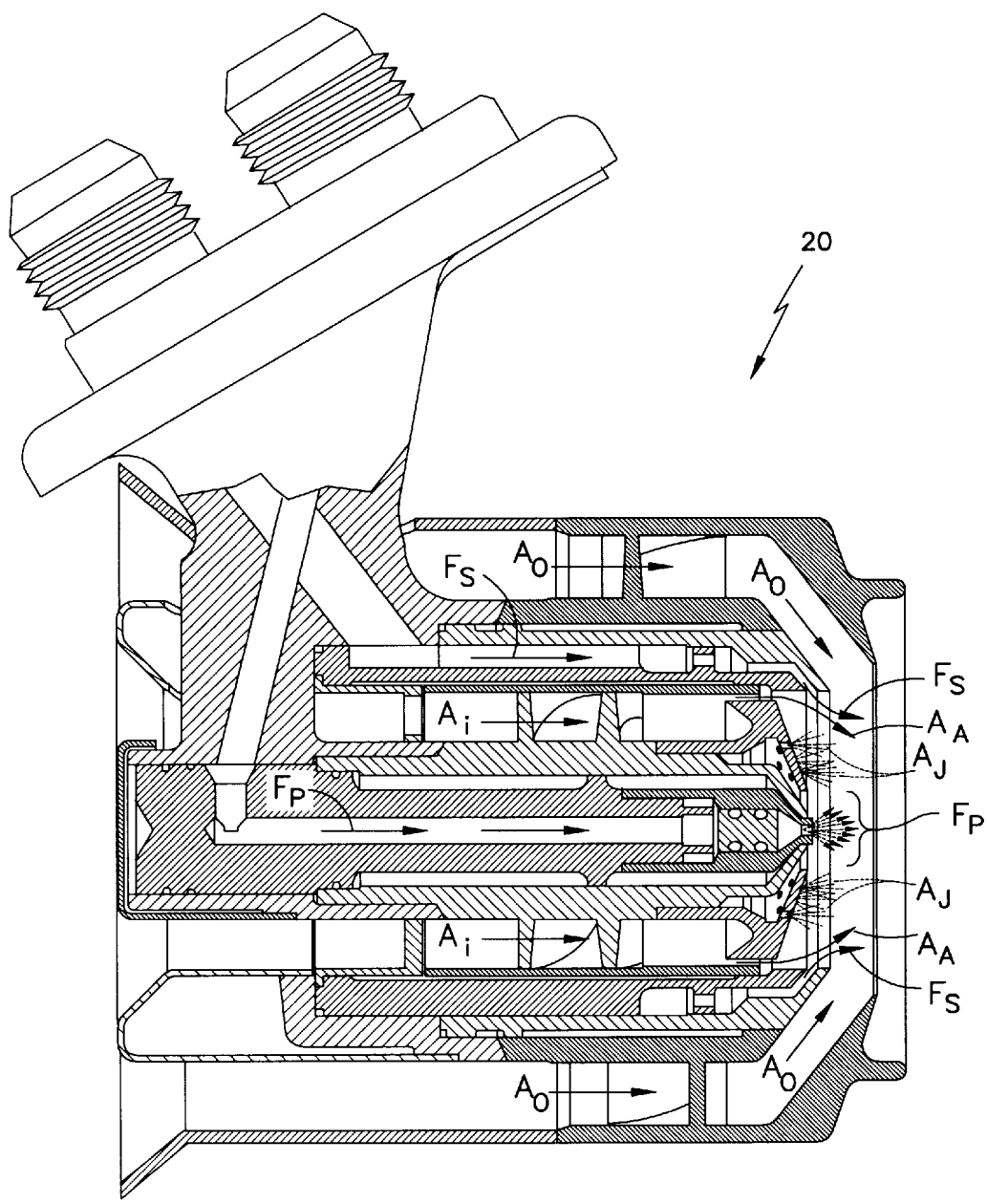
FIG. 5A is a cross sectional side view illustrating fuel and air flow through the fuel injector of FIG. 1.

Referring now to FIG. 5, the fuel injector 20 comprises an injector support 60 for securing the injector to the combustor module outer case 14. Primary and secondary fuel supply lines 62, 64 run through the support to supply fuel to the injector. A pressure atomizing core nozzle 66, disposed about a fuel injector centerline 68, extends axially through a bore in the support. The core nozzle includes a barrel 70 having a primary fuel passage 72 in communication with a source of primary fuel by way of the primary fuel supply line. The core nozzle also includes a swirler element 76 affixed to the aft end of the barrel. The swirler element includes a spiral passageway 78 and a primary fuel discharge orifice 80. A heatshield cap 82 covers the aft end of the core nozzle to retard heat transfer into the primary fuel passage. During operation, a high pressure stream of primary fuel $F_p$ flows through the primary fuel passage and into the swirler, which imparts swirl to the primary fuel stream. The swirling primary fuel stream then discharges through the discharge orifice 80 and enters the combustion zone of the combustor module.

The injector also includes first and second partitions that circumscribe the core nozzle. The first partition is an inner sleeve 84 whose aft end is a tapered surface 86 The inner sleeve cooperates with reduced diameter portions of the core nozzle to define air spaces 88 that inhibit undesirable heat transfer into the primary fuel stream $F_p$. The second partition is an intermediate sleeve 92 having a tapered surface 94 at its aft end and a radially outwardly projecting bulkhead 96. The intermediate sleeve cooperates with the first partition or inner sleeve 84 to define the radially outer and inner extremities of a substantially axially oriented annular inner air passage 98 that guides an inner air stream $A_i$ axially through the injector. A heatshield insert 102, which may be a two piece insert 102a, 102b as shown, lines the inner perimeter of the intermediate sleeve 92 to inhibit heat transfer from the inner airstream to a secondary fuel passage described hereinafter. The heatshield insert extends axially toward the forward end of the injector and cooperates with a cylindrical portion 104 of the fuel injector support to define an inlet 106 to the inner air passage. The forward end of the heatshield insert diverges away from the centerline 68 so that the inlet 106 is flared and captures as much air as possible. The inner air passage includes an inner air swirler comprising a plurality of inner swirl vanes 108 that extend across the passage to impart swirl to the inner air stream. The imparted swirl is co-directional relative to the swirl of the primary fuel stream.

The injector also includes a third partition. The third partition is an outer sleeve 110 having a chamfered splash surface 112. The aft end of the outer sleeve includes internally and externally tapered surfaces 114, 116. The outer sleeve circumscribes and cooperates with the second partition or intermediate sleeve 92 to define a secondary fuel passage that guides a stream of secondary fuel $F_s$ axially through the injector. The secondary fuel passage includes a slot 118 in communication with a source of secondary fuel by way of the secondary fuel line 64. The secondary fuel passage also includes an annular distribution chamber 120 and a swirler comprising a plurality of partially circumferentially directed secondary fuel orifices 122 that perforate the bulkhead 96 in the intermediate sleeve 92. The secondary fuel passage also includes an annular injection chamber 124 with an outlet 126. Because of the tapered surfaces 94, 114 at the aft end of the intermediate and outer sleeves 92, 110, the outlet is oriented so that fuel flowing out of the passageway is directed toward the injector centerline 68. During operation, the stream of secondary fuel $F_s$ flows through the secondary passage and through the secondary fuel orifices which impart swirl to the secondary fuel stream. The imparted swirl is co-directional relative to the swirl of the primary fuel. Individual jets of fuel discharged from the orifices then impinge on the splash surface 112, which helps reunite the individual jets into a circumferentially coherent fuel stream. The circumferentially coherent, swirling stream of secondary fuel then flows out of the passage outlet 126.

The injector also includes an outer housing 134. The outer housing includes an outer wall portion 136 that circumscribes the third partition or outer sleeve 110 and forms the radially outermost border of a substantially axially oriented annular outer air passage 138. The outer air passage guides a stream of outer air $A_o$ axially through the injector. The aft extremity of the wall portion 136 includes an internally tapered surface 140 that cooperates with the externally tapered surface 116 of the outer sleeve 110 to define an outlet 142 of the outer passage. Because of the cooperating tapered surfaces 116, 140, the outlet 142 is oriented to direct the outer air stream toward the injector centerline 68. The forward end of the outer wall portion diverges away from the centerline so that inlet 144 to the outer air passage is flared and captures as much air as possible. The outer housing 134 also includes an internal collar 148 that cooperates with the third partition or outer sleeve 110 to define an air space 150. The air space impedes heat transfer from the outer air to the secondary fuel stream. An outer air swirler, such as a plurality of outer swirl vanes 152 extending across the outer air passage, imparts swirl to the outer air. The direction of swirl is codirectional with the swirl imparted to the inner air stream by the inner swirl vanes 108.

The injector also includes an air distribution baffle 154 having a stem 156 and a cap 158 with an outer edge 160 and a tapered aft surface 164. The cap extends radially from the stem across the inner air passage 98 so that the cap edge 160 is radially spaced from the intermediate sleeve 92 and from heatshield insert 102 that lines the intermediate sleeve. The cap edge and heatshield thus define an air injection annulus 166 near the outermost periphery of the inner air passage. The cap also has a plurality of air injection orifices 168 extending therethrough in a substantially axial direction. During operation, the baffle divides the inner air stream into an annular substream $A_A$ that flows through the air injection annulus 166 and a plurality of air jets $A_J$ that issue from the injection orifices 168 The annular substream comprises between about 85% and 90% by mass of the inner air $A_i$.

One or more of the above described combustor can and fuel injector may comprise the principal components of a retrofit kit for reducing the emissions of an older generation gas turbine engine.

In operation, the injector bifurcates a source air stream into parallel, inner and outer streams $A_i$, $A_o$, that flow substantially axially through the inner and outer air passages 98, 138 respectively. The swirlers 108, 152 impart codirectional swirl to the airstreams. The injector receives primary fuel through the primary fuel line 62 and establishes a primary fuel stream $F_p$ that flows through the primary fuel passage 72, radially inwardly of the inner air stream and substantially in parallel therewith. The swirler element 76 imparts swirl to the primary fuel in a direction co-rotational relative to the swirl direction of the air streams. The injector also receives secondary fuel through the secondary fuel line 64 and establishes a secondary fuel stream $F_s$ that flows through the secondary fuel passages, radially intermediate the inner and outer air streams and substantially in parallel therewith. The circumferentially directed secondary fuel orifices 122 impart swirl to the secondary fuel in a direction co-rotational relative to the swirl direction of the air streams.

The baffle 154 divides the inner air stream $A_i$ into an annular substream $A_A$, radially spaced from the primary fuel stream, and a plurality of air jets $A_J$, that issue from the air injection orifices radially intermediate the annular substream and the primary fuel stream. The injector concurrently introduces the fuel streams, the outer air stream, the annular substream and the plurality of air jets into the rich burn zone of the combustor can. Because the baffle extends radially across the inner air passage, it backpressures the inner air stream so that the air jets $A_J$ issue from the orifices 168 with a high velocity and penetrate forcibly into the primary fuel stream $F_p$ discharged from primary fuel discharge orifice 80. As a result, the primary fuel becomes intimately mixed with the air issuing from the orifices to help limit the production of NOx, UHC's and smoke in the rich burn zone of the combustor can. The air jet penetration also helps to prevent local recirculation of primary fuel mist in the vicinity of the primary nozzle tip and therefore guards against coke formation on the tip. The air jet penetration also helps to disrupt a larger scale zone of recirculating air and secondary fuel that would otherwise develop near the tapered surface 164 and promote coke formation on that surface. Finally, because the baffle diverts most of the inner air into the annular substream $A_A$, which is radially spaced from the primary fuel stream, the injector is able to introduce an enriched core mixture of fuel and air near the injector centerline to guard against flame blowout during abrupt engine power reductions.

The coswirling character of the inner and outer air streams also promotes good fuel and air mixing and therefore contributes to reduced exhaust emissions. Experience has shown that counterswirling inner and outer air streams tend to negate each other. As a result, the secondary fuel stream enters the combustor can as a relatively cohesive annular jet of fuel that does not readily disperse. However, the coswirling air streams of the inventive injector intermingle readily with the secondary fuel to yield a well blended mixture that disperses in a conical pattern away from the injector centerline.

Figure 6:
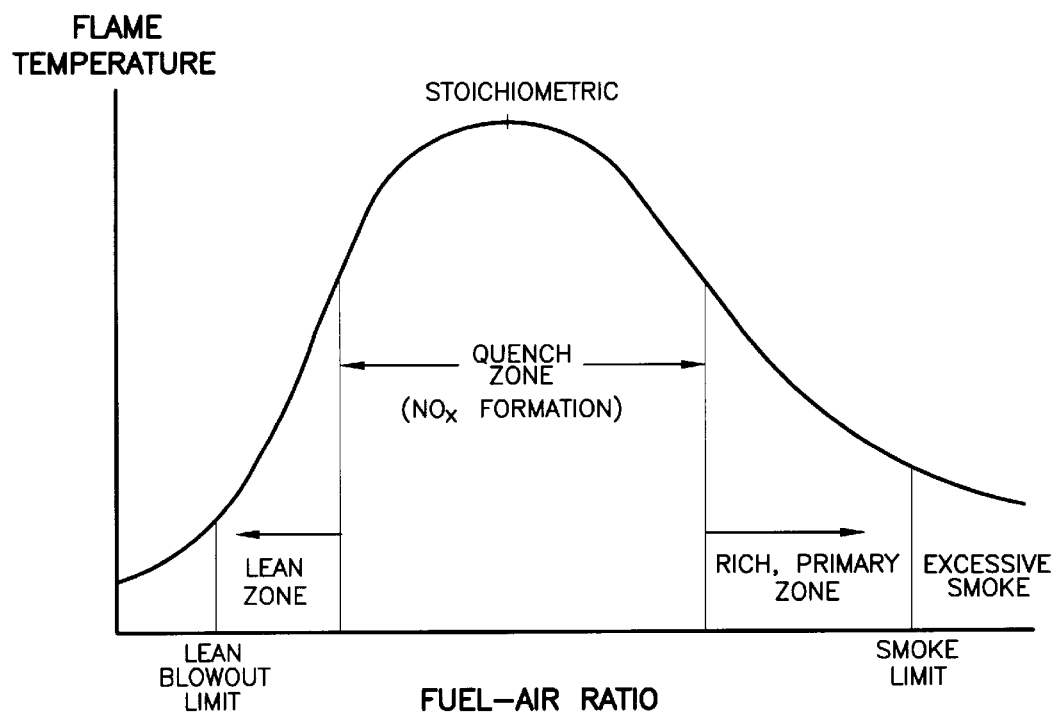
FIG. 6 is a graph depicting combustor operation in terms of flame temperature and fuel-air ratio.

Referring now to FIGS. 1, 1A and 6, the well blended, stoichiometrically rich mixture of air and fuel injected into the combustor can by the fuel injector is ignited and burned in the rich burn zone to partially release the energy content of the fuel. Because the fuel mixture is well blended, both NOx and smoke production are limited. That is, throughout the mixture the fuel-air ratio is high enough (and the flame temperature low enough) to resist NOx formation and low enough to resist smoke formation (FIG. 6).

The fuel rich combustion products from the rich burn zone then flow into the quench zone where the combustion process continues. The dilution holes 52, 54 admit jets of dilution air transversely into the combustion chamber. The dilution air mixes with the combustion products from the rich burn zone to support further combustion, raising the flame temperature and releasing additional energy content of the fuel. The first and second hole arrays 52, 54 are spaced a substantial distance axially aft of the injector guide 42. In the absence of such generous spacing, the swirling fuel and air discharged from the fuel injector could interact aerodynamically with the dilution air jets and draw a portion of the dilution air into the rich burn zone. Such an interaction would derich the mixture in the rich burn zone, causing increased NOx emissions and greater susceptibility to flame blowout during abrupt transients from high engine power to low power. However if the axial spacing is too generous, an excessive quantity of the cooling air introduced through the cooling air holes 30 (FIG. 1B) could infiltrate into the fuel-air mixture and increase NOx production in the rich burn zone. Experience suggests that the first hole array 52 can be positioned between about 40% and 50% of the combustor length fraction.

The quantity and size of the first holes 52 are selected so that the corresponding dilution air jets penetrate substantially to the liner centerline 28. If the quantity of holes is too large, the dilution jets may not penetrate to the liner centerline. As a result, fuel rich combustion products from the rich burn zone could pass through the quench zone, near the centerline, without becoming mixed with the dilution air. Not only would the residual energy content of the fuel remain unexploited, but the fuel rich mixture would contribute to smoke emissions. This is particularly true since the fuel injector is configured, as previously described, to introduce a somewhat enriched core mixture of fuel and air near the liner centerline 28. Conversely, if the quantity of holes is too small, the circumferential spacing S (FIG. 2) between the jets will be too large to ensure good mixing at locations radially remote from the centerline. Excessive circumferential spacing may also reduce the opportunity for contact between the fuel rich combustion products and the dilution jets. This, in turn, may lengthen the amount of time required to complete the quenching process which, because it elevates the flame temperature, promotes NOx formation. Since NOx formation is also time dependent, any delay in the quenching process will exacerbate NOx emissions.

Figure 7:
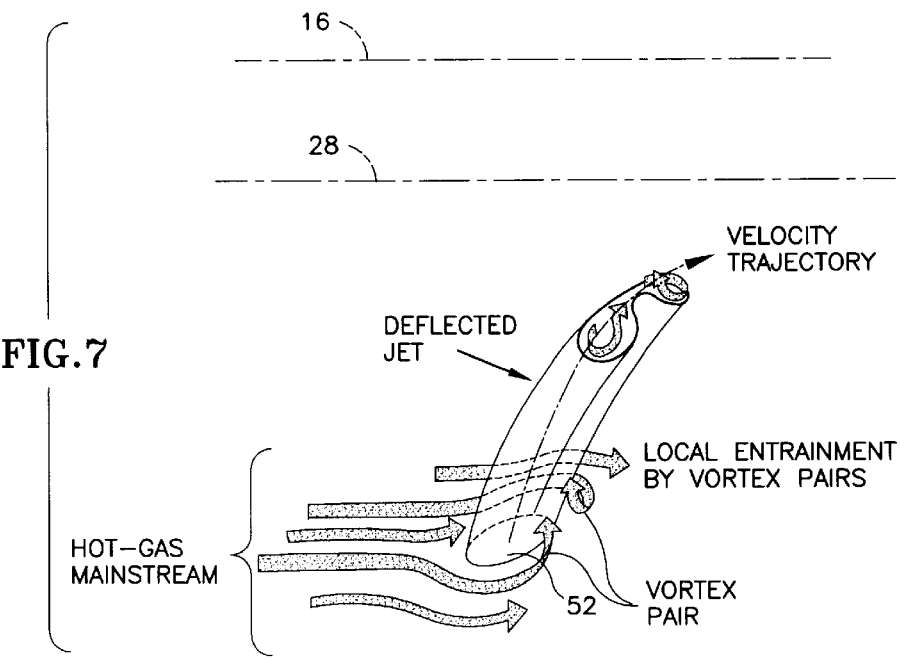
FIG. 7 is a schematic illustration of a dilution air jet entering a combustor can through a representative dilution hole.

The second array of dilution holes 54 admits additional jets of dilution air into the quench zone. The second hole array is axially proximate to the first hole array, and ideally as close as possible to the first hole away, to complete the quenching process as rapidly as possible and thereby limit NOx emissions. As an upper limit, it is suggested that the predetermined distance $D_{1-2}$ should be no more than about 15% of the effective axial length L of the liner, or about four times the diameter of the first holes 52, so that the second hole array is axially proximate to the first hole array. The holes of the second array are circumferentially aligned with the holes of the first array to ensure that the second jets of dilution air mix with fuel rich combustion products that are transported into the relatively quiescent region immediately aft of the first jets. Such transport of combustion products is thought to be the result of vortices (FIG. 7) that form in the main combustion gas stream when it interacts with the incoming dilution jets.

The holes of the second hole array are sized smaller than the holes of the first array. As a result, the dilution air admitted through the second hole array penetrates only part of the radial distance to the liner centerline. Full penetration of the second dilution jets is unnecessary since the quantity of dilution air admitted to the vicinity of the centerline by the first hole array is sufficient to suppress smoke emissions. The limited penetration depth of the second dilution jets also augments the liner cooling air to help keep the liner cool.

The stoichiometrically lean combustion products from the quench zone then enter the lean burn zone where the combustion process concludes. The third dilution hole array 56 admits additional dilution air into the lean burn zone to regulate the spatial temperature profile of the combustion products exiting the combustor can. The third hole array is spaced ahead of the liner trailing edge so that the additional dilution air has sufficient time and distance to mix with the combustion products and adjust their spatial temperature profile. However if the third hole array is too far ahead of trailing edge 48, excessive mixing could occur, thereby distorting the temperature profile. In the limit, it is suggested that the predefined distance $D_{1-3}$ from the first hole array 52 to the third hole array 56 should be at least about 29% of the effective axial length of the liner or about seven and one half times the diameter of the first hole array.

The quantity of dilution air admitted by the three arrays of dilution holes and the pressure drop of the dilution air are approximately the same as the air consumption and air pressure drop of an older generation combustor can that the inventive can is designed to replace. Accordingly, the inventive can does not affect the performance or operability of the engine, nor does it reduce the quantity of air available for use as a turbine coolant.

Although this invention has been shown and described with reference to a detailed embodiment thereof, it will be understood by those skilled in the art that various changes in form and detail may be made without departing from the invention as set forth in the accompanying claims.

We claim:

1. A combustor can for a turbine engine, comprising:
   a liner comprising a set of eleven axially adjacent louvers, the liner having a centerline, a forward end with a fuel injector port extending therethrough and an aft end terminating at a trailing edge, the liner circumscribing a combustion zone and having an effective axial length;
   a first array of dilution holes penetrating the liner about midway along the effective axial length of the liner and penetrating through the sixth of the eleven louvers;
   a second array of dilution holes penetrating the liner a predetermined distance aft of the first array and penetrating through the seventh of the eleven louvers, each hole of the second hole array being substantially circumferentially aligned with a hole of the first hole array; and
   a third array of dilution holes penetrating the liner aft of the second array and a predefined distance aft of the first array and penetrating through the tenth of the eleven louvers, the holes of the third array being nonequiangularly circumferentially distributed and irregularly sized.

2. A combustor can for a turbine engine, comprising:
   a liner with a centerline and a set of eleven axially adjacent louvers disposed about the liner centerline, the can having a forward end with a fuel injector port extending therethrough, the port being radially bordered by a fuel injector guide having a discharge opening, the can also having an aft end terminating at the trailing edge of the eleventh louver, the liner circumscribing a combustion zone and having an effective axial length;
   a first array of equiangularly distributed circular dilution holes each having a common first diameter and penetrating the sixth louver;
   a second array of equiangularly distributed circular dilution holes each having a common second diameter smaller than the first diameter and penetrating the seventh louver, each hole of the second hole array being substantially circumferentially aligned with a hole of the first hole array; and
   a third array of nonequiangularly distributed circular dilution holes having nonuniform third diameters and penetrating the tenth louver.

3. The combustor can of claim 2, the can having radially inner and outer extremities and wherein the first and second hole arrays each comprise twelve holes, one hole of each array being positioned at the can outer extremity, and wherein the third hole array comprises ten holes angularly distributed as specified below:

| Hole | Angular Offset |
| --- | --- |
| 1st | 0° |
| 2nd | 10° |
| 3rd | 48° |
| 4th | 108° |
| 5th | 144° |
| 6th | 180° |
| 7th | 216° |
| 8th | 252° |
| 9th | 312° |
| 10th | 350° | where the first hole is at the can outer extremity and the second through tenth holes are clockwisely displaced from the first hole by the specified angular offset as viewed by an observer looking from the aft end of the liner toward the forward end of the liner.

4. The combustor can of claim 3 wherein the sixth, seventh and tenth louvers have diameters of about 7.0, 7.0 and 6.1 inches respectively, the holes of the first hole array have a diameter of about 0.640 inches, the holes of the second hole array have a diameter of about 0.425 inches, and the holes of the third hole array have diameters, expressed in inches, as specified below:

| Hole | Diameter |
| --- | --- |
| 1st | 0.400 |
| 2nd | 0.150 |
| 3rd | 0.865 |
| 4th | 0.790 |
| 5th | 0.250 |

-continued

| Hole | Diameter |
|------|----------|
| 6th  | 0.680    |
| 7th  | 0.250    |
| 8th  | 0.830    |
| 9th  | 0.965    |
| 10th | 0.230.   |

5. The combustor can of claim 4 wherein the effective length of the can from the discharge opening of the fuel injector guide to the trailing edge of the eleventh louver is about 16.9 inches.

6. A combustion chamber assembly comprising:
a combustor can as in claim 1 or 2; and
a fuel injector projecting into the combustor can, the fuel injector comprising:
   a pressure atomizing core nozzle disposed about an injector centerline, the core nozzle having a discharge orifice for injecting a stream of primary fuel into a combustion zone of the module;
   first and second partitions circumscribing the core nozzle to define radially inner and outer extremities of an annular inner air passage for injecting a stream of inner air into the combustion zone;
   a third partition circumscribing the second partition and cooperating therewith to define a secondary fuel passage having an outlet oriented to direct a stream of secondary fuel into the combustion zone toward the injector centerline;
   an outer wall circumscribing the third partition and forming the radially outermost border of an annular outer air passage having an outlet oriented to direct a stream of outer air into the combustion zone toward the injector centerline; and
   an air distribution baffle having a cap with a plurality of air injection orifices extending therethrough, the cap extending radially across the inner air passage and having an outer edge radially spaced from the second partition to define an air injection annulus so that the cap divides the inner air stream into an annular substream that flows through the air injection annulus and a plurality of air jets that issue from the air injection orifices.

7. A retrofit kit for a gas turbine engine combustor module, comprising:
a combustor can as in claim 1 or 2; and
a fuel injector, comprising:
   a pressure atomizing core nozzle disposed about an injector centerline, the core nozzle having a discharge orifice for injecting a stream of primary fuel into a combustion zone of the module;
   first and second partitions circumscribing the core nozzle to define radially inner and outer extremities of an annular inner air passage for injecting a stream of inner air into the combustion zone;
   a third partition circumscribing the second partition and cooperating therewith to define a secondary fuel passage having an outlet oriented to direct a stream of secondary fuel into the combustion zone toward the injector centerline;
   an outer wall circumscribing the third partition and forming the radially outermost border of an annular outer air passage having an outlet oriented to direct a stream of outer air into the combustion zone toward the injector centerline; and
   an air distribution baffle having a cap with a plurality of air injection orifices extending therethrough, the cap extending radially across the inner air passage and having an outer edge radially spaced from the second partition to define an air injection annulus so that the cap divides the inner air stream into an annular substream that flows through the air injection annulus and a plurality of air jets that issue from the air injection orifices.

8. A combustor module for a gas turbine engine, comprising:
an annular pressure vessel defined by inner and outer cases disposed about an axially extending module centerline;
a plurality of combustor cans as in claim 1 or 2, each can having an inner extremity and an outer extremity, the cans being equiangularly distributed within the pressure vessel annulus so that the inner extremities of the cans are equidistant from the module centerline, each can being secured to the outer case;
a plurality of fuel injectors secured to the outer case and each projecting through a fuel injector port, the fuel injector comprising:
   a pressure atomizing core nozzle disposed about an injector centerline, the core nozzle having a discharge orifice for injecting a stream of primary fuel into a combustion zone of the module;
   first and second partitions circumscribing the core nozzle to define radially inner and outer extremities of an annular inner air passage for injecting a stream of inner air into the combustion zone;
   a third partition circumscribing the second partition and cooperating therewith to define a secondary fuel passage having an outlet oriented to direct a stream of secondary fuel into the combustion zone toward the injector centerline;
   an outer wall circumscribing the third partition and forming the radially outermost border of an annular outer air passage having an outlet oriented to direct a stream of outer air into the combustion zone toward the injector centerline; and
   an air distribution baffle having a cap with a plurality of air injection orifices extending therethrough, the cap extending radially across the inner air passage and having an outer edge radially spaced from the second partition to define an air injection annulus so that the cap divides the inner air stream into an annular substream that flows through the air injection annulus and a plurality of air jets that issue from the air injection orifices.

9. A combustor can for a turbine engine, comprising:
a liner having a centerline, a forward end with a fuel injector port extending therethrough and an aft end terminating at a trailing edge, the liner circumscribing a combustion zone and having an effective axial length and comprising a set of eleven axially adjacent louvers;
a first array of dilution holes penetrating the sixth of the eleven louvers about midway along the effective axial length of the liner;
a second array of dilution holes penetrating the seventh of the eleven louvers a predetermined distance aft of the first array, each hole of the second array being substantially circumferentially aligned with a hole of the first hole array; and
a third array of dilution holes penetrating the tenth of the eleven louvers a predefined distance aft of the first array, the holes of the third array being circumferentially distributed and sized so that a combustion gas stream issuing from the aft end of the liner exhibits a radial temperature profile that approximates a prescribed temperature profile.

10. A combustion chamber assembly comprising:

a combustor can comprising:
- a liner having a centerline, a forward end with a fuel injector port extending therethrough and an aft end terminating at a trailing edge, the liner circumscribing a combustion zone and having an effective axial length;
- a first array of dilution holes penetrating the liner about midway along the effective axial length of the liner;
- a second array of dilution holes penetrating the liner a predetermined distance aft of the first array, each hole of the second hole array being substantially circumferentially aligned with a hole of the first hole array; and
- a third array of dilution holes penetrating the liner aft of the second array and a predefined distance aft of the first array, the holes of the third array being circumferentially distributed and sized so that a combustion gas stream issuing from the aft end of the liner exhibits a radial temperature profile that approximates a prescribed temperature profile; and a fuel injector projecting into the combustor can, the fuel injector comprising:
  - a pressure atomizing core nozzle disposed about an injector centerline, the core nozzle having a discharge orifice for injecting a stream of primary fuel into a combustion zone of the module;
  - first and second partitions circumscribing the core nozzle to define radially inner and outer extremities of an annular inner air passage for injecting a stream of inner air into the combustion zone;
  - a third partition circumscribing the second partition and cooperating therewith to define a secondary fuel passage having an outlet oriented to direct a stream of secondary fuel into the combustion zone toward the injector centerline;
  - an outer wall circumscribing the third partition and forming the radially outermost border of an annular outer air passage having an outlet oriented to direct a stream of outer air into the combustion zone toward the injector centerline; and
  - an air distribution baffle having a cap with a plurality of air injection orifices extending therethrough, the cap extending radially across the inner air passage and having an outer edge radially spaced from the second partition to define an air injection annulus so that the cap divides the inner air stream into an annular substream that flows through the air injection annulus and a plurality of air jets that issue from the air injection orifices.

11. A retrofit kit for a gas turbine engine combustor module, comprising:

a combustor can comprising:
- a liner having a centerline, a forward end with a fuel injector port extending therethrough and an aft end terminating at a trailing edge, the liner circumscribing a combustion zone and having an effective axial length;
- a first array of dilution holes penetrating the liner about midway along the effective axial length of the liner;
- a second array of dilution holes penetrating the liner a predetermined distance aft of the first array, each hole of the second hole array being substantially circumferentially aligned with a hole of the first hole array; and
- a third array of dilution holes penetrating the liner aft of the second array and a predefined distance aft of the first array, the holes of the third array being circumferentially distributed and sized so that a combustion gas stream issuing from the aft end of the liner exhibits a radial temperature profile that approximates a prescribed temperature profile; and a fuel injector comprising:
  - a pressure atomizing core nozzle disposed about an injector centerline, the core nozzle having a discharge orifice for injecting a stream of primary fuel into a combustion zone of the module;
  - first and second partitions circumscribing the core nozzle to define radially inner and outer extremities of an annular inner air passage for injecting a stream of inner air into the combustion zone;
  - a third partition circumscribing the second partition and cooperating therewith to define a secondary fuel passage having an outlet oriented to direct a stream of secondary fuel into the combustion zone toward the injector centerline;
  - an outer wall circumscribing the third partition and forming the radially outermost border of an annular outer air passage having an outlet oriented to direct a stream of outer air into the combustion zone toward the injector centerline; and
  - an air distribution baffle having a cap with a plurality of air injection orifices extending therethrough, the cap extending radially across the inner air passage and having an outer edge radially spaced from the second partition to define an air injection annulus so that the cap divides the inner air stream into an annular substream that flows through the air injection annulus and a plurality of air jets that issue from the air injection orifices.

12. A combustor module for a gas turbine engine, comprising:

a) an annular pressure vessel defined by inner and outer cases disposed about an axially extending centerline;

b) a plurality of combustor cans, each can having an inner extremity and an outer extremity, the cans being equiangularly distributed within the pressure vessel annulus so that the inner extremities of the cans are equidistant from the module centerline, each can being secured to the outer case, each combustor can comprising:
- a liner having a centerline, a forward end with a fuel injector port extending therethrough and an aft end terminating at a trailing edge, the liner circumscribing a combustion zone and having an effective axial length;
- a first array of dilution holes penetrating the liner about midway along the effective axial length of the liner;
- a second array of dilution holes penetrating the liner a predetermined distance aft of the first array, each hole of the second hole array being substantially circumferentially aligned with a hole of the first hole array; and
- a third array of dilution holes penetrating the liner aft of the second array and a predefined distance aft of the first array, the holes of the third array being circumferentially distributed and sized so that a combustion gas stream issuing from the aft end of the liner exhibits a radial temperature profile that approximates a prescribed temperature profile; and c) a plurality of fuel injectors, each secured to the outer case and each projecting into the combustor can through one of the fuel injector ports, each fuel injector comprising:

a pressure atomizing core nozzle disposed about an injector centerline, the core nozzle having a discharge orifice for injecting a stream of primary fuel into a combustion zone of the module;

first and second partitions circumscribing the core nozzle to define radially inner and outer extremities of an annular inner air passage for injecting a stream of inner air into the combustion zone;

a third partition circumscribing the second partition and cooperating therewith to define a secondary fuel passage having an outlet oriented to direct a stream of secondary fuel into the combustion zone toward the injector centerline;

an outer wall circumscribing the third partition and forming the radially outermost border of an annular outer air passage having an outlet oriented to direct a stream of outer air into the combustion zone toward the injector centerline; and an air distribution baffle having a cap with a plurality of air injection orifices extending therethrough, the cap extending radially across the inner air passage and having an outer edge radially spaced from the second partition to define an air injection annulus so that the cap divides the inner air stream into an annular substream that flows through the air injection annulus and a plurality of air jets that issue from the air injection orifices.

* * * * *